United States Patent
Bensmann et al.

(10) Patent No.: US 11,383,821 B2
(45) Date of Patent: Jul. 12, 2022

(54) WING LEADING-EDGE DEVICE AND A WING HAVING SUCH A WING LEADING-EDGE DEVICE

(71) Applicant: Airbus Operations GmbH, Hamburg (DE)

(72) Inventors: Stefan Bensmann, Hamburg (DE); Marcus Erban, Hamburg (DE); Martin Fees, Hamburg (DE)

(73) Assignee: Airbus Operations GmbH

( * ) Notice: Subject to any disclaimer, the term of this patent is extended or adjusted under 35 U.S.C. 154(b) by 112 days.

(21) Appl. No.: 16/808,551

(22) Filed: Mar. 4, 2020

(65) Prior Publication Data

US 2020/0298956 A1 Sep. 24, 2020

(30) Foreign Application Priority Data

Mar. 22, 2019 (DE) .................. E10 2019 107 371.5

(51) Int. Cl.
 *B64C 9/22* (2006.01)
 *B64C 3/50* (2006.01)
 *B64C 3/18* (2006.01)

(52) U.S. Cl.
 CPC .................. *B64C 9/22* (2013.01); *B64C 3/50* (2013.01); *B64C 3/185* (2013.01); *B64C 3/187* (2013.01)

(58) Field of Classification Search
 CPC .. B64C 9/22; B64C 3/50; B64C 3/185; B64C 3/187
 See application file for complete search history.

(56) References Cited

U.S. PATENT DOCUMENTS

| 6,551,428 | B1 | 4/2003 | Guillou et al. | |
| 2008/0237401 | A1* | 10/2008 | Overbergh | B64C 9/22 244/214 |
| 2009/0101759 | A1 | 4/2009 | West et al. | |
| 2010/0193635 | A1* | 8/2010 | Barr | B64C 9/24 244/123.1 |
| 2019/0002080 | A1* | 1/2019 | Schlipf | B64C 3/28 |

(Continued)

FOREIGN PATENT DOCUMENTS

| DE | 60019203 T2 | 1/2006 |
| DE | 602005006384 T2 | 5/2009 |
| EP | 1768898 B1 | 6/2008 |

(Continued)

OTHER PUBLICATIONS

Extended European Search Report with Written Opinion for Application No. 20163659.4 dated Aug. 7, 2020, 7 pages.

(Continued)

*Primary Examiner* — Assres H Woldemaryam
(74) *Attorney, Agent, or Firm* — Lerner, David, Littenberg, Krumholz & Mentlik, LLP (57) ABSTRACT

A wing leading-edge device includes a flow body having a front side, a back side, a plurality of ribs arranged in ribs, wherein at least one of the ribs is a load introduction rib having at least one first lug for coupling with a drive mechanism, a second load path component, which includes at least one second lug, wherein the second load path component is at least connected to the load introduction rib, such that a second opening of the at least one second lug is co-axial with a first opening of the at least one first lug.

13 Claims, 5 Drawing Sheets

(56) References Cited

U.S. PATENT DOCUMENTS

2019/0233129 A1\* 8/2019 Lafont .................... B64C 3/187

FOREIGN PATENT DOCUMENTS

| EP | 1972547 A1 | 9/2008 |
|----|------------|--------|
| EP | 2134597 B1 | 6/2011 |
| EP | 3326909 A1 | 5/2018 |
| GB | 2458683 A  | 9/2009 |

OTHER PUBLICATIONS

German Search Report for Application No. DE 10 2019 107 371.5 dated Nov. 25, 2019, 2 pages.

\* cited by examiner

WING LEADING-EDGE DEVICE AND A WING HAVING SUCH A WING LEADING-EDGE DEVICE

FIELD OF THE INVENTION

The invention relates to a wing leading-edge device, a wing having a fixed wing body and a wing leading-edge device, as well as an aircraft.

BACKGROUND OF THE INVENTION

For increasing the lift coefficient of a wing of a commercial aircraft, high lift systems are known. These may include trailing edge flaps, and leading-edge devices. During takeoff and landing, they are usually activated, i.e. moved from a retracted into an extended position.

Leading-edge slats usually comprise a front skin, a back skin and mechanical interfaces for coupling with a slat track.

BRIEF SUMMARY OF THE INVENTION

An aspect of the invention proposes an alternative wing leading-edge device that comprises a further increased mechanical reliability.

A wing leading-edge device is proposed, comprising a flow body having a front side, a back side and a plurality of ribs arranged in the flow body, wherein at least one of the ribs is a load introduction rib comprising at least one first lug for coupling with a drive mechanism, further comprising a second load path component, which comprises at least one second lug, wherein the second load path component is at least connected to the load introduction rib, such that a second opening of the at least one second lug is co-axial with a corresponding first opening of the at least one first lug.

The flow body may comprise an elongate shape that extends along a spanwise direction of the wing to which it is attached. The flow body further comprises a certain profile contour, which is mainly determined by the desired aerodynamic characteristics. It is preferred that the flow body is sufficiently stiff to serve for the intended purpose. It may be preferred that the flow body comprises stiffening elements, such as ribs, spars and also stringers, which are arranged on an inner side of e.g. a front skin.

In the context of the invention, several ribs are arranged inside the flow body, which all act as stiffening elements. At least one of them and preferably two of the ribs act as load introduction ribs. They are mechanically adapted for a reliable load transfer between the flow body and a drive mechanism, such as a slat track mechanism or similar. Consequently, the at least one lug in the at least one load introduction rib is provided for coupling with a drive mechanism. By coupling the at least one lug with the drive mechanism, a first load path between the drive mechanism and the flow body is provided.

By arranging the second load path component into the flow body and connecting it at least to the load introduction rib, a second load path between the drive mechanism and the flow body is created. If the load introduction rib experiences a mechanical impairment, the second load path component may thus transfer the mechanical load from the at least one second lug to the remaining part of the flow body.

The lugs each comprise at least one opening. The first lug comprises at least one first opening and the second lug comprises at least one second opening. When arranging a first lug relative to a second lug such that their openings are co-axial, a bolt, an axle or any other suitable component may extend through both lugs. This also includes differently shaped openings in both lugs. For example, an opening of one of the lugs may be somewhat larger than the opening of the other lug. In this way, e.g. the smaller opening defines a primary load path, while the larger opening leads to a secondary load path. Hence, co-axial openings do not rule out tolerances in the dimensions and shapes of the respective openings.

For the sake of completeness, the term co-axial may also be referred to as coaxal or concentric. Two openings are concentric, coaxal, or coaxial when they share the same center point or axis.

The second load path component may comprise an arbitrary shape, which mainly depends on the remaining parts inside the flow body. It may comprise a chamfered section, a flange, one or several lugs or attachment points. Its shape is adapted to the part of the flow body, to which it is attached. For example, it may be attached to the load introduction rib completely, to a spar, to a skin or a combination thereof. In the following, some embodiments are provided, in which more precise shapes are defined.

Advantageously, the flow body comprises a spar that substantially extends parallel to a spanwise leading edge of the flow body and that separates the flow body into a front section and at least one rear section, wherein the at least one lug is arranged in the at least one rear section. A plurality of spars may be used that are arranged in the flow body. The load introduction rib thus extends from a rear section to the front section. The at least one lug is arranged in the rear section and thus faces a fixed leading edge, to which the leading-edge device may be coupled.

In an advantageous embodiment, the spar is arranged transverse to the ribs, wherein the second load path component is chamfered and connected to both the load introduction rib and the spar. The second load path component may thus be connected to the rib in the region of the at least one first lug. Since the rib is arranged transverse to the spar, a chamfered design of the second load path component allows the second load path to also extend along at least a part of the spar directly forward the at least one first lug. By connecting the second load path component to the spar, an additional load path extends from the at least one second lug to the spar.

Preferably, the second load path component comprises an upper flange connected to the spar. The upper flange may be a chamfered part of the second load path component and extends upwardly.

Preferably, the second load path component extends along at least 90% of an internal height of the spar inside the flow body. In this case, the second load path component may comprise a stripe-shaped section that is attached to a section that is connected with the load introduction rib. However, two stripe-shaped sections may be provided, which are attached to both sides of the section that is connected to the rib. In this case, the second load path component may comprise a symmetrical design. By extending over this substantial height of the spar, many individual connections between second load path component and the spar can be provided. In this regard, the internal height of the spar is to be understood as a clear extension between two opposed ends of the spar in a vertical direction. The vertical direction may be a z-axis of the aircraft, to which the flow body is coupled. It may also be an axis transverse to both the spanwise axis and the chordwise axis of the flow body.

In an advantageous embodiment, the second load path component may be a flat component and exclusively connected to the respective load introduction rib. Thus, it may be flushly attached to the load introduction rib or a pocketed area of the load introduction rib through several connecting means. It may extend over a substantial part of the load introduction rib and thus provides a rather large second load path. The second load path component may thereby have a shape that partially corresponds to the shape of the respective load introduction rib. However, its extension may be clearly smaller. For example, it may roughly comprise an L-shape having a first surface section and a second surface section that are arranged transverse to each other, wherein the first surface section comprises the at least one second lug and substantially extends along a chordwise axis, while the second surface section extends along a substantially vertical axis to extend along the forward section of the load introduction rib. However, other shapes are possible. For example, the second load path component may comprise the shape of the load introduction rib in a forward section, while a flange or a web is arranged in the rearward section to merely cover a part of the load introduction rib that comprises the at least one first lug.

Advantageously, the second load path component extends from the at least one rear section into the front section. The load transfer is thus achieved over a large surface area and may be provided substantially over the whole load introduction rib.

In a further advantageous embodiment, the second load path component comprises an upper flange and/or a lower flange connected to at least one of a front skin and a back skin of the flow body forward or above of the at least one second lug. These flanges may thus provide a connection of the second load path component to at least one of the two skins that are arranged on the flow body. It is feasible to provide both flanges to connect the second load path component to both skins. However, it may also be possible to attach the second load path component to just one of the skins. This may particularly be the case if the at least one first lug is arranged on a part of the respective load introduction rib that sticks out of a hollow space of the flow body, for instance through a suitable cut-out. The upper flange may then extend into the direction of an upper delimiting edge of the cut-out. Here, a connection to the spar may be created with the upper flange.

Still further, the second load path component may comprise at least one lateral flange connected to the spar. The lateral flange may be a chamfered part of the second load path component and provides a reliable load transfer.

In another advantageous embodiment, the load introduction rib and the second load path component are mirror inverted and each comprise a flat attachment surface, wherein the load introduction rib and the second load path component are attached to one another through the attachment surfaces. Thus, an assembly is created that has the shape of a common load introduction rib, which is divided in a chordwise direction into two halves, wherein one of the halves constitutes the load introduction rib and the other half constitutes the second load path component. Hence, both halves together create the first and the second load path. Both the load introduction rib and the second load path component comprise matching attachment surfaces that are substantially identically dimensioned. The assembly may comprise an increased width compared to common ribs. Consequently, by doubling substantially the complete load introduction rib, the reliability of the load transfer from the at least one first lug to the drive mechanism is clearly increased.

It may be feasible to provide an additional flat component between the attachment surfaces as a crack stopper. The flat component may be realized in the form of a plate or inlay. It may comprise a stiff material like steel or titanium.

Instead or additional to the use of a spar or other stiffening components, the flow body may also comprise at least one stringer that extends substantially parallel to a spanwise leading edge of the flow body at least along a front skin of the flow body, wherein the second load path component is coupled with the at least one stringer. This may be considered for flow bodies that are designed according to another design principle that uses stringers, i.e. longitudinal stiffening bodies that extend in a spanwise direction.

The invention also relates to a wing having a fixed wing body and a wing leading-edge device according to the above description.

Finally, the invention also relates to an aircraft, having at least one such wing.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
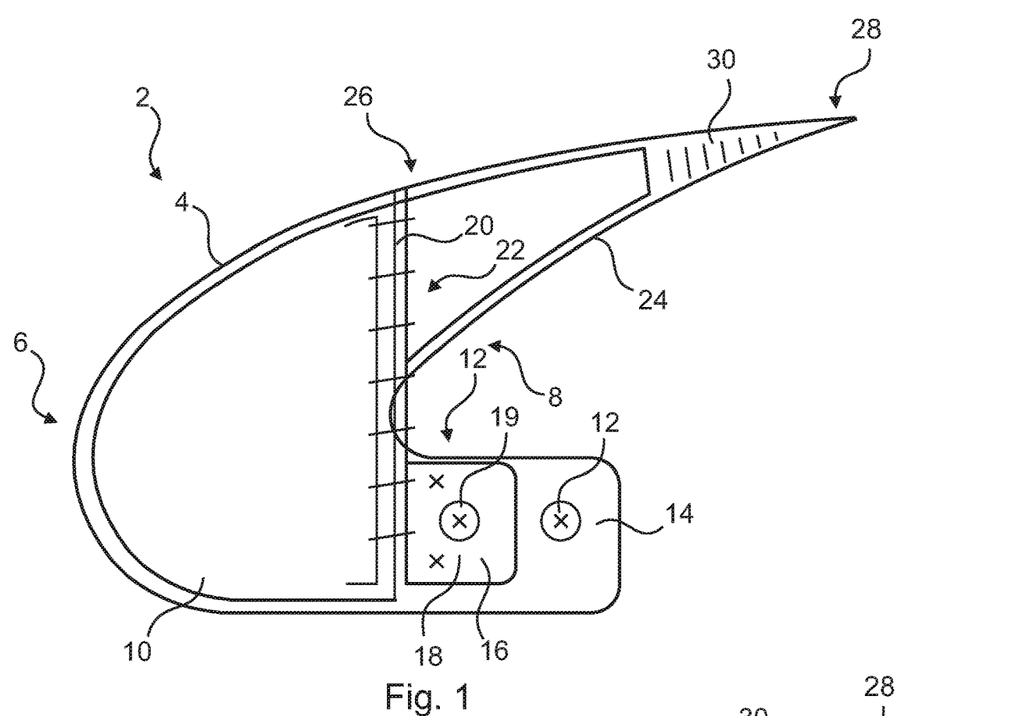
FIGS. 1 to 4 show exemplary embodiments in lateral section views.

FIG. 1 shows a first exemplary embodiment of a wing leading-edge device 2 in a lateral, cross-sectional view. The wing leading-edge device 2 comprises a flow body 4 having a front side 6, a back side 8 and a plurality of ribs 10 arranged in the flow body 4. The ribs 10 are distributed in the flow body 4 along a spanwise axis, such that the flow body 4 is stiffened. For coupling the flow body 4 with a drive mechanism (not shown), one or two of the ribs 10 constitute a load introduction rib. The rib 10 comprises a first lug 14 in the form of a web, in which a first opening 12 is arranged. In this regard, the first opening 12 is to be understood as an opening in the first lug 14. The first lug 12 exemplarily comprises two first openings 12. One of these is arranged in a forward position and one is arranged in a rearward position. Here, only one first opening 12 is visible, which is arranged at a rear end of the first lug 14. A further forward first opening 12 is covered by a second load path component 16.

The second load path component 16 comprises a second lug 18, which has a second opening 19 that is positioned in a co-axial manner with a corresponding first opening 12 of the first lug 14. In the context of the invention this is to be understood as the respective openings 12 and 19 of the lugs 14 and 18 being arranged concentrically to each other, such that a bolt or another device may extend through the openings of both lugs to provide a rotatability around the common axis of the openings of both lugs. The second load path component 16 is connected to the load introduction rib 10 in the region of the first lug 14 and extends over approximately half the surface of the first lug 14. Forward of the first lug 14 and the second load path component 16, a spar 20 is arranged. The second load path component 16 is chamfered and may exemplarily comprise a stripe shaped extension or upper flange 22 transverse to the first lug 14 and parallel to the spar 20. The upper flange 22 is connected to the spar 20 substantially along the whole available height of the spar 20. This may be at least 90% of the available height.

When attaching the wing leading-edge device 2 to a drive mechanism, such as a slat track, a connection is made by using the first lug 14 as well as the second lug 18, as its second opening 19 is co-axial with a first opening 12 of the first lug 14. The load between the flow body 4 and the respective drive mechanism is transferred over a first load path in the form of the load introduction rib 10. A second load path is created through the second load path component 16. Thus, two individual load paths are created for increasing the reliability and safety of the wing leading-edge device 2.

For the sake of completeness, further depicted elements are briefly explained. They are not absolutely required in their illustrated design and may also be modified according to individual requirements. For example, a back skin 24 is arranged on the back side 8, while a front skin 26 is arranged on the front side 6. An upper, trailing edge 28 comprises a stiffening arrangement 30. The wing leading-edge device 2 is exemplarily shown as a leading edge slat.

Figure 2:
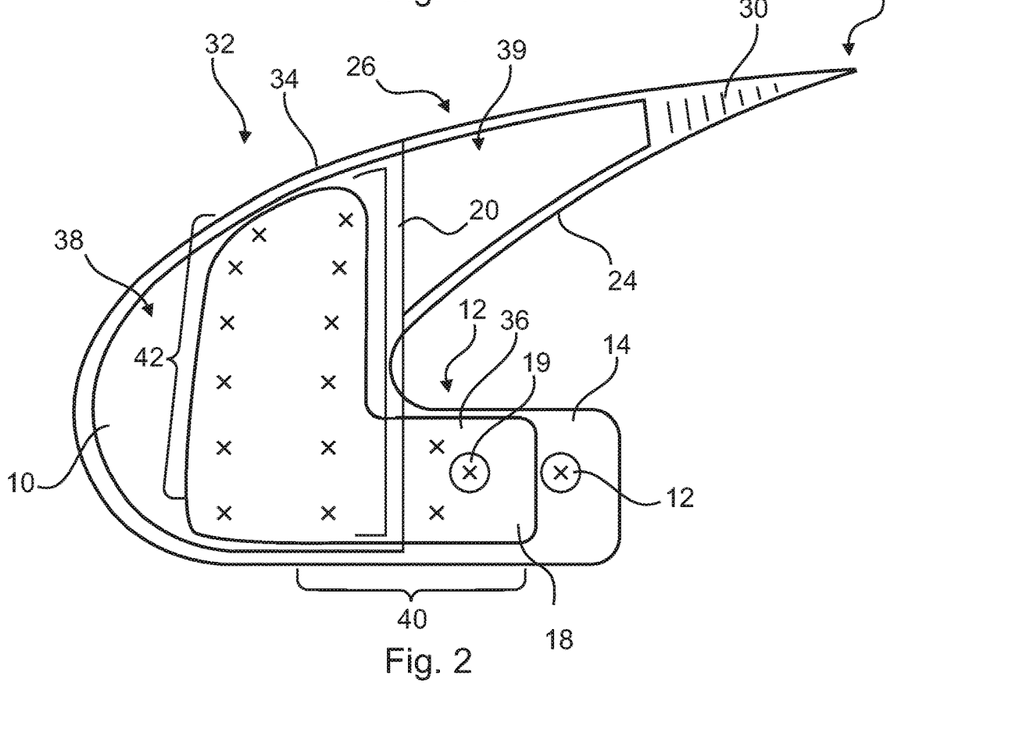

In FIG. 2, a wing leading-edge device 32 is shown, which comprises a flow body 34 having substantially the same design as flow body 4 in FIG. 1. However, a second load path component 36 is provided, which differs from the second load path component 16 of FIG. 1. The spar 20 separates the flow body 34, as in the above and all remaining exemplary embodiments, into a front section 38 and a rear section 39. Further, in this exemplary embodiment, the second load path component 36 is a substantially flat component, which roughly comprises an L-shape that extends to a front section 38 of the flow body 34 that is forward the spar 20. In this example, the second load path component 36 is exclusively connected to the load introduction rib 10. In the shape of the second load path component 36 a first surface section 40 extends along at least a part of the first lug 14. Another surface section 42 substantially extends over the whole available height of the rib 10 in the front section 38. As the second load path component 36 extends into the front section 38, the spar 20 may comprise a cutout at least for the first surface section 40.

Figure 3:
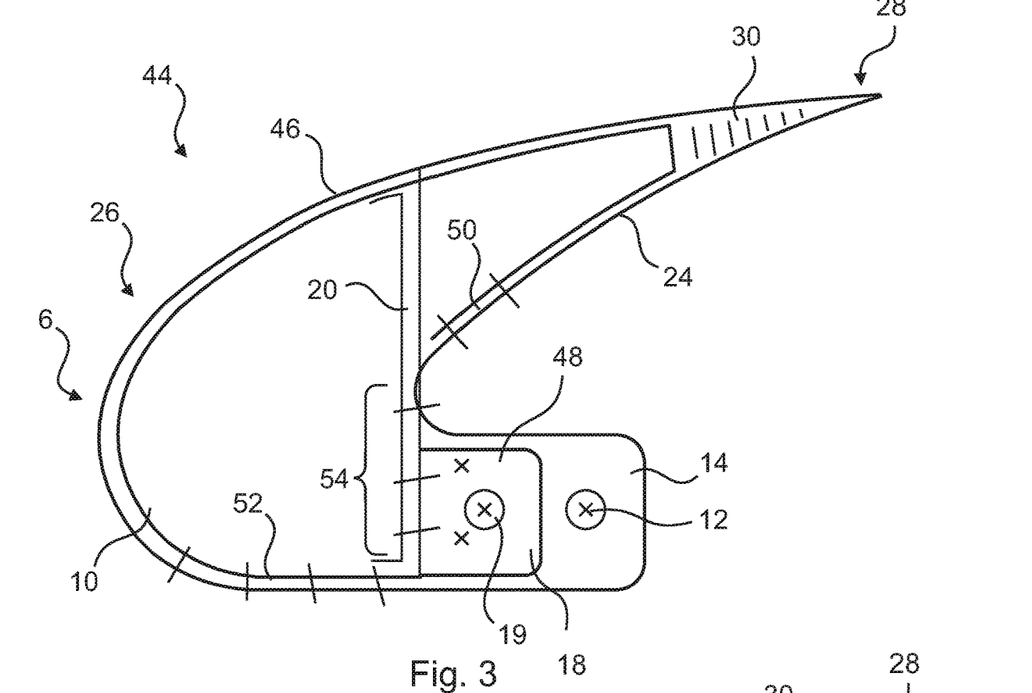

FIG. 3 shows a still further embodiment of a wing leading-edge device 44 having a flow body 46, which is similarly designed to the previous exemplary embodiments. However, a second load path component 48 is provided, which is attached to the first lug 14 of the load introduction rib 10 and comprises an upper flange 50 and a lower flange 52 that both extend in a substantially chordwise direction. The upper flange 50 is attached to the back skin 24, while the lower flange 52 is attached to the front skin 26. Furthermore, the second load path component 48 may comprise a central portion 54, which is connected to the spar 20. Thus, the second load path component 48 has a plurality of connections to different parts of the flow body 46, which leads to an even further increased reliability through creation of a second load path.

Figure 4:
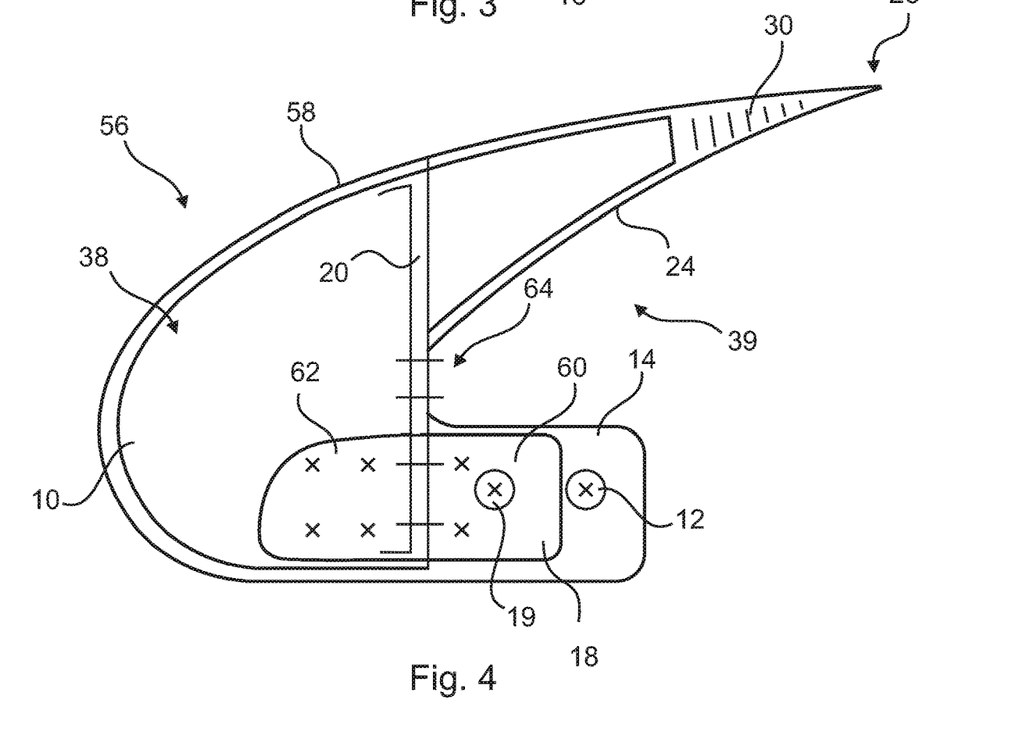

FIG. 4 shows a further exemplary embodiment in form of a wing leading-edge device 56 having a flow body 58, which has a similar design as the flow bodies 46, 34 and 4 explained above. A second load path component 60 is provided, which is attached to the first lug 14 of the load introduction rib 10 and comprises an extension 62, which extends into the front section 38 of the flow body 58.

However, the extension 62 is only slightly larger than the section of the second load path component 60 that is attached to the first lug 14. In addition, thereto, an upper flange 64 extends transverse to the extension 62 and parallel to the spar 20. It runs along the spar 20 into the direction of the back skin 24 and ends just before reaching the back skin 24. In this region, which has a similar design as the central portion 54 in FIG. 3, the upper flange 64 is attached to the spar 20.

Figure 5:
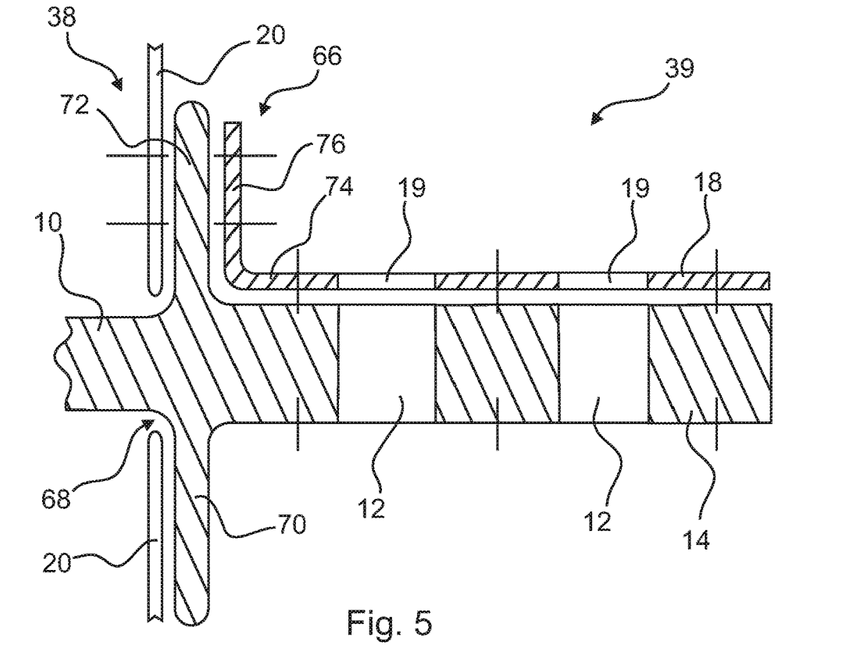
FIGS. 5 to 9 show exemplary embodiments in top sectional views.

FIG. 5 shows a sectional view of a flow body 66 with the load introduction rib 10 reaching through the spar 20 through a cutout 68. The load introduction rib 10 comprises two flanges 70 and 72. In this view, both first openings 12 are shown. On one side of the load introduction rib 10, a second load path component 74 is provided. Exemplarily, this embodiment of the second load path component 74 comprises a second lug 18 with two second openings 19, which are co-axial with the first openings 12 of the first lugs 14, i.e. the openings of the lugs 14 and 18 are concentrically arranged. The second load path component 74 in this case is chamfered to create a lateral flange 76, which is attached to the flange 72 of the load introduction rib 10. If bolts (not shown) are inserted into the first openings 12 of the first lug 14 for connecting a slat track or a similar drive mechanism, they are also connected to the second lug 18 by reaching through the second openings 19. Thus, a second load path is created.

Figure 6:
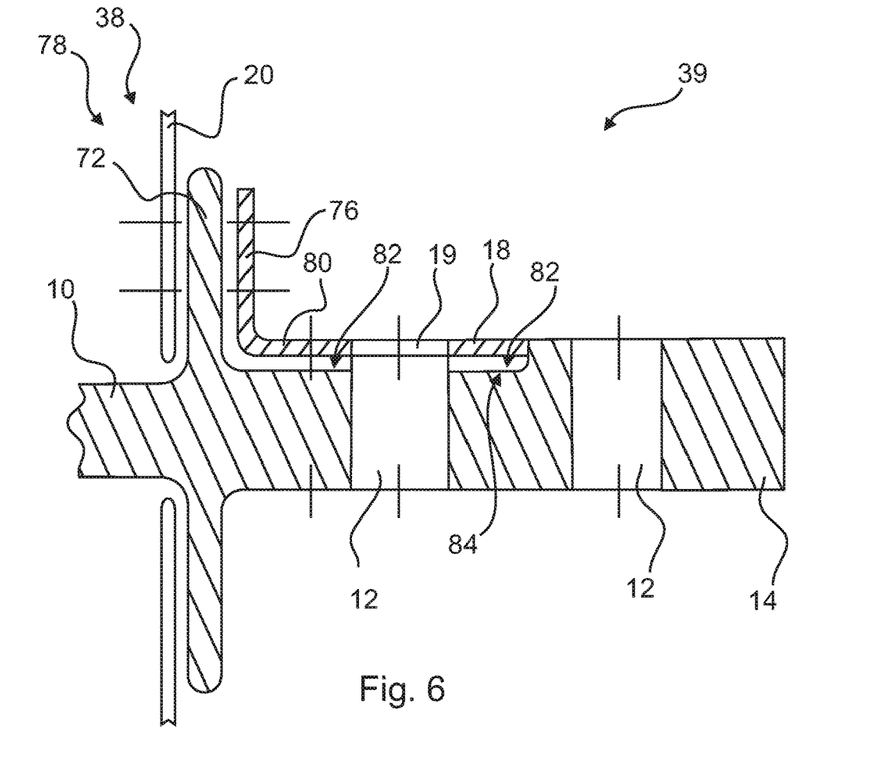

FIG. 6 shows a slight modification in a flow body 78. Here, a second load path component 80 is shown, which comprises a second lug 18, which has one second opening 19 arranged co-axially with a forward first opening 12 of a first lug 12. For providing a width of the combination of the load introduction rib 10 and the second load component 80 that does not exceed the width of a load introduction rib 10 without such a second load path component 80, a lateral recess 82 is provided. However, as an alternative, the second load component 80 may exceed the width of the load introduction rib 10. The lateral recess 82 ends directly rearward of the second load path component 80, such that there is a step 84 at a rear end of the recess 82. Thus, modifications for the bolts or other components are not required. In this case, the second load path component 80 comprises a forward flange 76 that is attached to the flange 72 of the load introduction rib 10.

Figure 7:
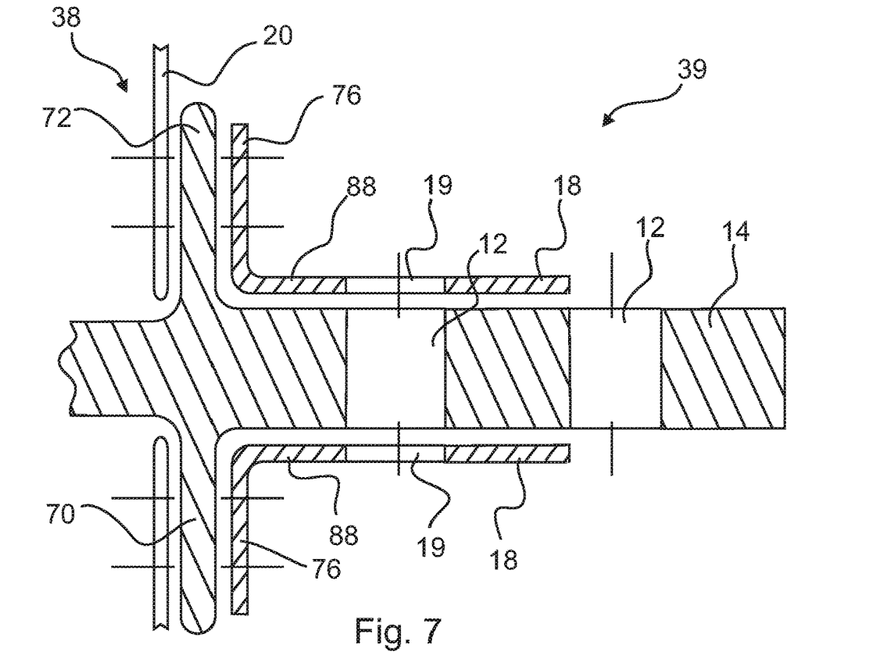

FIG. 7 shows a flow body 86, which comprises two second load path components 88, each having a flange 76 for connection to the flanges 70 and 72 as well as the spar 20. The second load path components 88 comprise a second lug 18, which in each case has a second opening 19 that is arranged co-axial with a forward first opening 12 of the corresponding first lug 14, i.e. the openings 12 and 19 are concentrically arranged.

Figure 8:
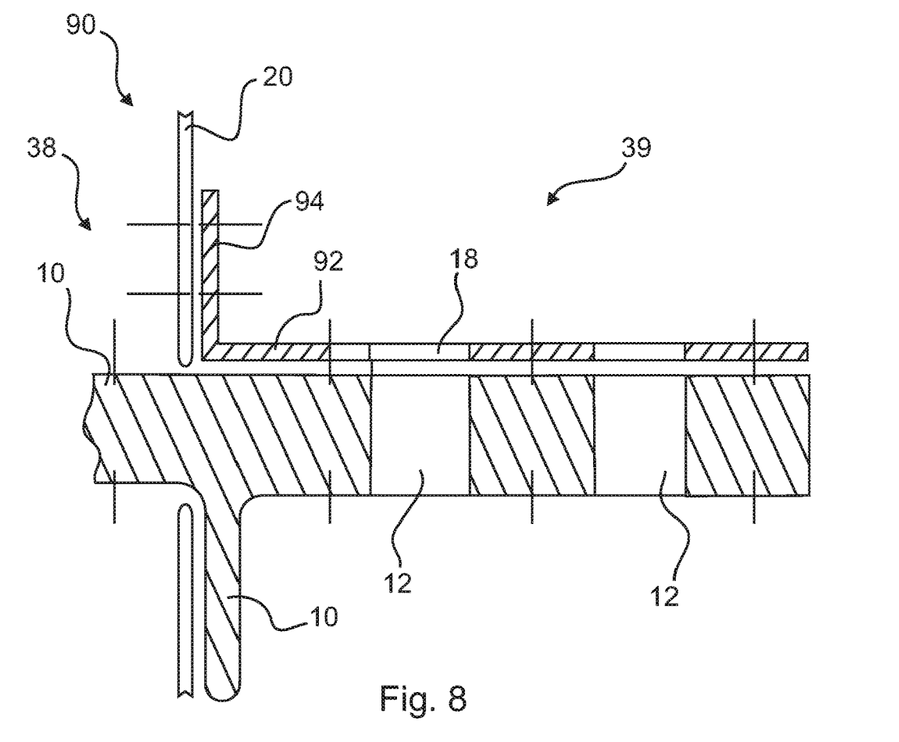

FIG. 8 shows a flow body 90, which is similar to the exemplary embodiment of FIG. 5, but with the load introduction rib 10 only comprising one of the flanges 70. A second load path component 92 is provided, which is connected to the spar 20 and has a lateral flange 94, that rests flushly and directly on the spar 20 or a pocketed area thereof.

Figure 9:
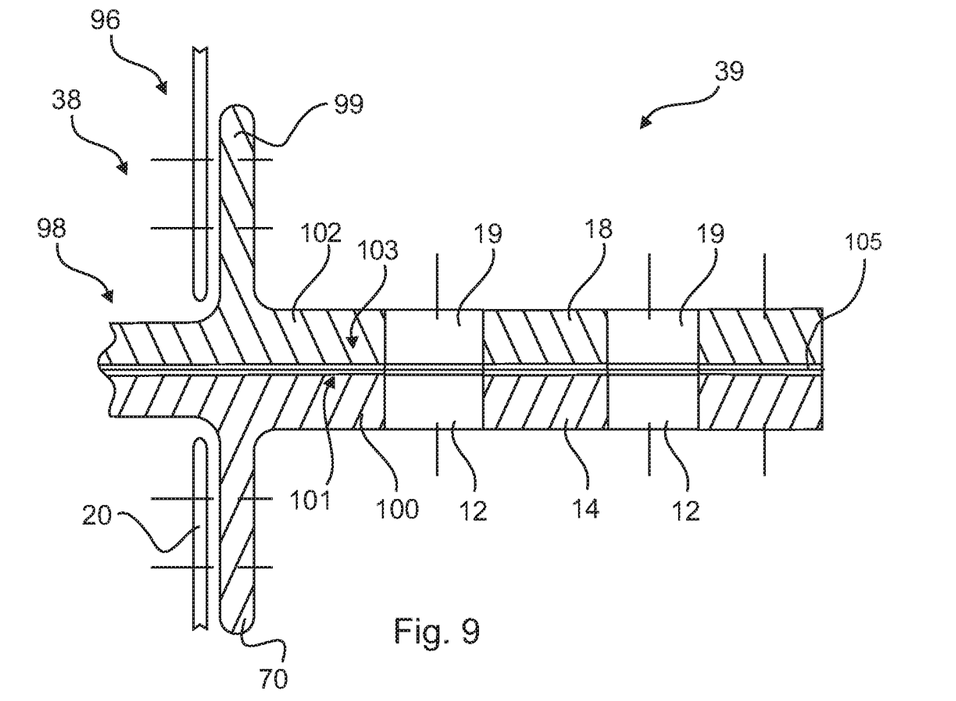

Still further, FIG. 9 illustrates a flow body 96 having an assembly 98 that comprises a load introduction rib 100 in form of a first half of the assembly 98 and a second load path component 102 in the form of a second half. Both halves may have the shape of a load introduction rib 10 of some of the previous exemplary embodiments but may optionally comprise a greater width. They comprise flat attachment surfaces 101 and 103, which can be brought into surface contact, such that a symmetrical assembly 98 is created. Of course, other assemblies are possible, which are not symmetrical. In this example, the attachment surfaces 101 and 103 determine a symmetry plane. The second load path component 102 comprises a lateral flange 99 for connection to the spar 20. A flange 70 of the load introduction rib 100 may as well be connected to the spar 20. The load introduction rib 100 and the second load path component 102 are exemplarily mirror inverted. The load introduction rib 100 comprises two first openings 12 in a first lug 14. The second load path component 102 comprises two second openings 19 in a second lug 18. Both first openings 12 are arranged co-axial with the second openings 19. Optionally, an additional flat component 105 may be arranged between the attachment surfaces 101, 103 as a crack stopper.

Figure 10:
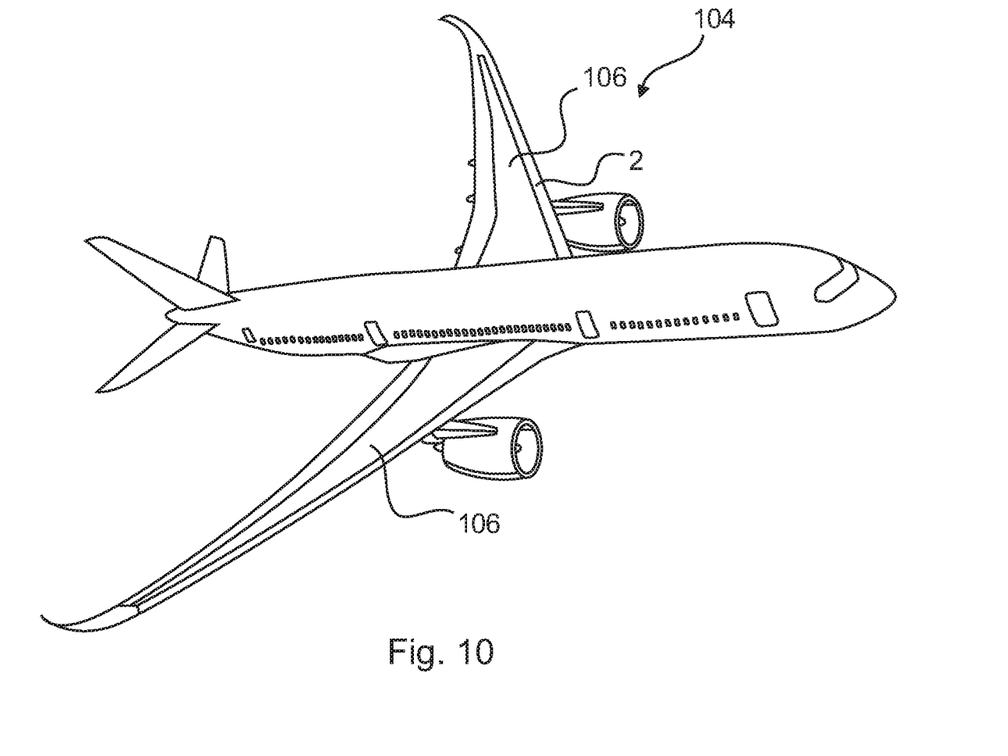
FIG. 10 shows an aircraft in a three-dimensional view.

Lastly, FIG. 10 shows an aircraft 104 having wings 106 with a wing leading-edge device 2. However, all other examples may be used on the aircraft 104.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 wing leading-edge device
4 flow body
6 front side
8 back side
10 rib
12 first opening
14 first lug
16 second load path component
18 second lug
19 second opening
20 spar
22 upper flange
24 back skin
26 front skin
28 trailing edge
3 stiffening arrangement
32 wing leading-edge device
34 flow body
36 second load path component
38 front section
40 first surface section
42 second surface section
44 wing leading-edge device
46 flow body
48 second load path component
50 upper flange
52 lower flange
54 central portion
56 wing leading-edge device
58 flow body
60 second load path component
62 extension
64 upper flange
66 flow body
68 cutout
70 flange
72 flange
74 second load path component
76 lateral flange
78 flow body
80 second load path component
82 recess
84 step
86 flow body
88 second load path component
90 flow body
92 second load path component
94 lateral flange
96 flow body
98 assembly
99 lateral flange
100 load introduction rib
101 attachment surface
102 second load path component
103 attachment surface
104 aircraft
106 wing

The invention claimed is:

1. A wing leading-edge device, comprising:
a flow body having a front side, and a back side; and
a plurality of ribs arranged in the flow body,
wherein at least one of the plurality of ribs is a load introduction rib comprising at least one first lug for coupling with a drive mechanism,
a second load path component, comprising at least one second lug,
wherein the second load path component is at least connected to the load introduction rib, such that a second opening of the at least one second lug is co-axial with a first opening of the corresponding at least one first lug, and such that a surface of the second load path component is at least in a partial contact with a surface of the at least one first lug.

2. The wing leading-edge device of claim 1,
wherein the flow body comprises a spar extending substantially parallel to a spanwise leading edge of the flow body and separating the flow body into a front section and at least one rear section, and
wherein the at least one first lug is arranged in the at least one rear section.

3. The wing leading-edge device of claim 2,
wherein the spar is arranged transverse to the ribs, and
wherein the second load path component is chamfered and connected to both the load introduction rib and the spar.

4. The wing leading-edge device of claim 3, wherein the second load path component comprises an upper flange connected to the spar.

5. The wing leading-edge device of claim 3, wherein the second load path component extends along at least 90% of an internal height of the spar inside the flow body.

6. The wing leading-edge device of claim 1, wherein the second load path component is a flat component and exclusively connected to the respective load introduction rib.

7. The wing leading-edge device of claim 2, wherein the second load path component extends from the at least one rear section into the front section.

8. A wing leading-edge device comprising:
a flow body having a front side, and a back side; and
a plurality of ribs arranged in the flow body,
wherein at least one of the plurality of ribs is a load introduction rib comprising at least one first lug for coupling with a drive mechanism,
a second load path component, comprising at least one second lug,
wherein the second load path component is at least connected to the load introduction rib, such that a second opening of the at least one second lug is co-axial with a first opening of the corresponding at least one first lug, and
wherein the second load path component comprises at least one of an upper flange or a lower flange connected to at least one of a front skin and a back skin of the flow body forward or above of the at least one second lug.

9. The wing leading-edge device of claim 2, wherein the second load path component comprises at least one lateral flange connected to the spar.

10. The wing leading-edge device of claim 1,
wherein the load introduction rib and the second load path component are mirror inverted and each comprises a flat attachment surface, and
wherein the load introduction rib and the second load path component are attached to one another through the attachment surfaces.

11. The wing leading-edge device of claim 10, wherein an additional flat component is arranged between the attachment surfaces as a crack stopper.

12. A wing having a fixed wing body and a wing leading-edge device according to claim 1.

13. An aircraft, having at least one wing according to claim 12.

* * * * *